(12) United States Patent
Feng et al.

(10) Patent No.: US 8,751,786 B1
(45) Date of Patent: *Jun. 10, 2014

(54) METHOD AND INTEGRATED CIRCUIT FOR LOADING AND EXECUTING FIRMWARE BASED ON PROGRAMING OF ONE-TIME PROGRAMMABLE MEMORY

(71) Applicant: Marvell International Ltd., Hamilton (BM)

(72) Inventors: Weishi Feng, San Jose, CA (US);
Marcus Carlson, Santa Clara, CA (US);
Pantas Sutardja, Los Gatos, CA (US);
Bin Ni, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,819

(22) Filed: Sep. 17, 2013

Related U.S. Application Data

(60) Continuation of application No. 13/647,045, filed on Oct. 8, 2012, now Pat. No. 8,539,216, which is a continuation of application No. 13/279,832, filed on Oct. 24, 2011, now Pat. No. 8,285,980, which is a division of application No. 12/001,107, filed on Dec. 10, 2007, now Pat. No. 8,046,571.

(60) Provisional application No. 60/870,491, filed on Dec. 18, 2006.

(51) Int. Cl.
*G06F 9/00* (2006.01)
*G06F 9/24* (2006.01)
*G06F 15/177* (2006.01)

(52) U.S. Cl.
USPC ............... 713/2; 713/1; 713/176; 713/189

(58) Field of Classification Search
USPC ........................... 713/1, 2, 176, 189
See application file for complete search history.

(56) References Cited

U.S. PATENT DOCUMENTS

| | | | |
|---|---|---|---|
| 6,622,184 B1 | 9/2003 | Tabe et al. | |
| 7,117,352 B1 | 10/2006 | Giles et al. | |
| 7,278,128 B1 * | 10/2007 | Trimberger | 716/117 |
| 8,285,980 B1 * | 10/2012 | Feng et al. | 713/2 |
| 2002/0184512 A1 * | 12/2002 | Cardoso, Jr. | 713/193 |
| 2005/0099832 A1 | 5/2005 | Becker | |
| 2005/0105331 A1 | 5/2005 | Lee et al. | |
| 2006/0090084 A1 | 4/2006 | Buer | |
| 2007/0050622 A1 | 3/2007 | Rager et al. | |
| 2007/0064497 A1 | 3/2007 | Louie et al. | |
| 2007/0094507 A1 | 4/2007 | Rush | |
| 2007/0226477 A1 | 9/2007 | Haban et al. | |
| 2008/0148001 A1 | 6/2008 | Gehrmann et al. | |
| 2009/0222652 A1 | 9/2009 | Khan et al. | |

* cited by examiner

*Primary Examiner* — Vincent Tran

(57) ABSTRACT

An integrated circuit includes a first memory, a second memory, a processor, and a descrambler. The first memory is configured to store a key. The first memory is a one-time-programmable memory. The processor is configured to: determine whether the first memory has been programmed; and in response to the first memory not having been programmed, (i) load firmware from a third memory into the second memory, and (ii) execute the firmware. The third memory is separate from the integrated circuit. The processor is also configured to, in response to the first memory having been programmed, load the firmware from the third memory into the second memory. The descrambler is configured to, in response to the first memory having been programmed, descramble the firmware based on the key.

20 Claims, 8 Drawing Sheets

METHOD AND INTEGRATED CIRCUIT FOR LOADING AND EXECUTING FIRMWARE BASED ON PROGRAMING OF ONE-TIME PROGRAMMABLE MEMORY

CROSS-REFERENCE TO RELATED APPLICATIONS

This application is a continuation of U.S. patent application Ser. No. 13/647,045 (now U.S. Pat. No. 8,539,216), filed Oct. 8, 2012, which is a continuation of U.S. patent application Ser. No. 13/279,832 (now U.S. Pat. No. 8,285,980), filed Oct. 24, 2011, which is a divisional of U.S. patent application Ser. No. 12/001,107 (now U.S. Pat. No. 8,046,571) filed on Dec. 10, 2007, which claims the benefit of U.S. Provisional Application No. 60/870,491, filed on Dec. 18, 2006. The disclosures of the applications referenced above are incorporated herein by reference.

FIELD

The present disclosure relates generally to integrated circuits. More particularly, the present disclosure relates to system-on-a-chip (SoC) security.

BACKGROUND

Recent advances in integrated circuit technology have led to the proliferation of so-called system-on-a-chip (SoC) integrated circuits, where a processor is embedded with memory and other hardware blocks such as application-specific circuits on a single integrated circuit chip. FIG. 1 shows a prior art SoC system 100 including a SoC 122. SoC 122 includes a processor 102, a volatile memory 114, a non-volatile memory 110, and an application-specific circuit 116.

In addition, SoC 122 usually includes a test interface 104, such as a Joint Test Action Group (JTAG) interface, for use in debugging and testing SoC 122. Test interface 104 is generally connected to processor 102 and application-specific circuit 116, and can be connected to other circuits in SoC 122 as well. For example, test interface 104 can be used to trace the execution by processor 102 of firmware stored in volatile memory 114.

However, while useful during development, test interface 104 also provides an opening for attackers to penetrate SoC 122 once deployed in the field. For example, an attacker can use test interface 104 to copy or modify the firmware to break the security of systems in which SoC 122 is deployed. SoC 122 may employ secrets such as secret keys to prevent unauthorized access to certain resources. For example, a SoC 122 deployed in a Digital Video Disc (DVD) player/burner can employ a secret key to prevent a user from making copies of a copy-protected DVD. An attacker can use test interface 104 to obtain the secret key, and then use the DVD player/burner to make copies of copy-protected DVDs.

In addition to SoC 122, SoC system 100 usually includes an external memory 106 to store firmware and confidential data, such as private keys, device IDs, and the like, for SoC 122. But because memory 106 is external to SoC 122, hackers may be able to obtain the firmware and confidential data by monitoring the interface between external memory 106 and SoC 122.

SUMMARY

An integrated circuit is provided and includes a first memory, a second memory, a processor, and a descrambler. The first memory is configured to store a key. The first memory is a one-time-programmable memory. The processor is configured to: determine whether the first memory has been programmed; and in response to the first memory not having been programmed, (i) load firmware from a third memory into the second memory, and (ii) execute the firmware. The third memory is separate from the integrated circuit. The processor is also configured to, in response to the first memory having been programmed, load the firmware from the third memory into the second memory. The descrambler is configured to, in response to the first memory having been programmed, descramble the firmware based on the key.

In other features, a method is provided and includes storing a key in a first memory. The first memory is a one-time-programmable memory. The first memory is implemented in an integrated circuit. The method further includes: determining whether the first memory has been programmed; and in response to the first memory not having been programmed, (i) loading firmware from a third memory into a second memory, and (ii) executing the firmware. The second memory is implemented in the integrated circuit. The third memory is separate from the integrated circuit. The method further includes, in response to the first memory having been programmed, (i) loading the firmware from the third memory into the second memory, and (ii) descrambling the firmware based on the key.

A system-on-a-chip is provided and includes a first memory and a processor. The first memory is configured to store a boot code. The processor is configured to (i) access the first memory, and (ii) execute the boot code when booting up. The processor is configured to, while booting up, determine whether a first one-time-programmable memory has been previously programmed based on the boot code. The processor is configured to, in response to the first one-time-programmable memory not having been previously programmed based on the boot code, (i) load firmware from a second memory into a third memory, and (ii) execute the firmware loaded into the third memory. The processor is configured to, in response to the first one-time-programmable memory having been previously programmed, verify a digital signature of the firmware.

In other features, a method is provided and includes storing a boot code in a first memory. The first memory is accessed via a processor. The first memory and the processor are implemented within a system-on-a-chip. The boot code is executed while booting up the processor. The method further includes, while booting up the processor, determining whether a first one-time-programmable memory has been previously programmed based on the boot code. In response to the first one-time-programmable memory not having been previously programmed based on the boot code, (i) firmware is loaded from a second memory into a third memory, and (ii) the firmware loaded into the third memory is executed. In response to the first one-time-programmable memory having been previously programmed based on the boot code, verifying a digital signature of the firmware.

In general, in one aspect, an apparatus is provided and includes: a processor; a test interface that is in communication with the processor only when the test interface is enabled; a first one-time-programmable (OTP) memory; and a non-volatile memory to store boot code for the processor. When the processor is booted, the boot code causes the processor to test the first OTP memory. The boot code causes the processor to enable the test interface when the first OTP memory has not been programmed. The boot code causes the processor to disable the test interface when the first OTP memory has been programmed.

Implementations of the apparatus can include one or more of the following features. Some implementations include a second OTP memory. The boot code causes the processor to disable programmability of the second OTP memory when the first OTP memory has been programmed. The boot code causes the processor to enable programmability of the second OTP memory based on a password. The boot code causes the processor to enable the test interface when the second OTP memory has been programmed. Some implementations include a third OTP memory. When the processor is booted, the boot code causes the processor to test the third OTP memory. The boot code causes the processor to disable the test interface when the third OTP memory has been programmed.

Some implementations include a fourth OTP memory to store a hash of the password. The boot code causes the processor to enable programmability of the second OTP memory based on the password and the hash of the password stored in the fourth OTP memory. In some implementations, the processor programs the OTP memories according to programming signals. Some implementations include a fifth OTP memory to store a key. A descrambler descrambles data received from an external memory according to a key. Some implementations include an integrated circuit that includes the apparatus. Some implementations include a hard disk drive that includes the integrated circuit. Some implementations include a disk player that includes the integrated circuit.

In one implementation, a method is provided that includes: testing a first one-time-programmable (OTP) memory; enabling communication between a test interface and a processor when the first OTP memory has not been programmed; and disabling communication between the test interface and the processor when the first OTP memory has been programmed.

Implementations of the method can include one or more of the following features. Some implementations include: disabling programmability of a second OTP memory when the first OTP memory has been programmed; enabling programmability of the second OTP memory based on a password; and enabling communication between the test interface and the processor when the second OTP memory has been programmed. Some implementations include: testing a third OTP memory; and disabling communication between the test interface and the processor when the third OTP memory has been programmed. Some implementations include enabling programmability of the second OTP memory based on the password and a hash of the password stored in a fourth OTP memory. Some implementations include programming the OTP memories according to programming signals. Some implementations include receiving data from an external memory; and descrambling the data according to a key stored in a fifth OTP memory.

In other features, an apparatus is provided and includes: a processor; a volatile memory; a one-time-programmable (OTP) memory; and a non-volatile memory to store boot code for the processor. When the processor is booted, the boot code causes the processor to test the OTP memory. The boot code causes the processor to load instructions from an external memory to the volatile memory, and to execute the instructions, when the OTP memory has not been programmed. The boot code causes the processor to verify a digital signature of the instructions in the external memory before loading the instructions to the volatile memory when the OTP memory has been programmed.

Implementations of the apparatus can include one or more of the following features. Some implementations include a descrambler. The instructions in the external memory are scrambled. When the OTP memory has been programmed, the descrambler descrambles the scrambled instructions after loading the scrambled instructions to the volatile memory. Some implementations include a descrambler. The instructions in the external memory are scrambled. When the OTP memory has been programmed, the descrambler descrambles the instructions according to a key programmed in the OTP memory. Some implementations include an integrated circuit that includes the apparatus. Some implementations include a hard disk drive that includes the integrated circuit. Some implementations include a disk player that includes the integrated circuit.

In other features, a method is provided and includes: testing a one-time-programmable (OTP) memory; loading instructions from an external memory, and executing the instructions, when the OTP memory has not been programmed; and verifying a digital signature of the instructions in the external memory before loading the instructions when the OTP memory has been programmed. In some implementations, the instructions in the external memory are scrambled. The method further includes: descrambling the scrambled instructions after loading the scrambled instructions when the OTP memory has been programmed. In some implementations, the instructions in the external memory are scrambled. The method further includes: descrambling the scrambled instructions according to a key programmed in the OTP memory when the OTP memory has been programmed.

In other features, an apparatus is provided and includes: means for processing data; means for test interfacing that is in communication with the means for processing only when the means for test interfacing is enabled; first one-time-programmable (OTP) memory means for storing data; and non-volatile memory means for storing boot code for the means for processing. When the means for processing is booted, the boot code causes the means for processing to test the first OTP memory means. The boot code causes the means for processing to enable the means for test interfacing when the first OTP memory means has not been programmed. The boot code causes the means for processing to disable the means for test interfacing when the first OTP memory means has been programmed.

Implementations of the apparatus can include one or more of the following features. Some implementations include second OTP memory means for storing data. The boot code causes the means for processing to disable programmability of the second OTP memory means when the first OTP memory means has been programmed. The boot code causes the means for processing to enable programmability of the second OTP memory means based on a password. The boot code causes the means for processing to enable the means for test interfacing when the second OTP memory means has been programmed. Some implementations include third OTP memory means for storing data. When the means for processing is booted, the boot code causes the means for processing to test the third OTP memory means. The boot code causes the means for processing to disable the means for test interfacing when the third OTP memory means has been programmed. Some implementations include fourth OTP memory means for storing a hash of the password. The boot code causes the means for processing to enable programmability of the second OTP memory means based on the password and the hash of the password stored in the fourth OTP memory means. In some implementations, the means for processing programs the OTP memory means according to programming signals. Some implementations include fifth OTP memory means for storing a key; and descrambler means for descrambling data received from an external memory according to the key. Some implementations include an integrated circuit that includes the apparatus. Some implementations include a hard disk drive that includes the integrated circuit. Some implementations include a disk player that includes the integrated circuit.

In other features, a computer program executable on a processor is provided and includes: instructions for testing a first one-time-programmable (OTP) memory; instructions for enabling communication between a test interface and a processor when the first OTP memory has not been programmed; and instructions for disabling communication between the test interface and the processor when the first OTP memory has been programmed.

Implementations of the computer program can include one or more of the following features. Some implementations include: instructions for disabling programmability of a second OTP memory when the first OTP memory has been programmed; instructions for enabling programmability of the second OTP memory based on a password; and instructions for enabling communication between the test interface and the processor when the second OTP memory has been programmed. Some implementations include: instructions for testing a third OTP memory; and instructions for disabling communication between the test interface and the processor when the third OTP memory has been programmed. Some implementations include instructions for enabling programmability of the second OTP memory based on the password and a hash of the password stored in a fourth OTP memory. Some implementations include instructions for programming the OTP memories according to programming signals. Some implementations include instructions for descrambling data received from an external memory according to a key stored in a fifth OTP memory.

In other features, an apparatus is provided and includes: means for processing data; volatile memory means for storing data; one-time-programmable (OTP) memory means for storing data; and non-volatile memory means for storing boot code for the processor. When the processor is booted, the boot code causes the means for processing to test the OTP memory. The boot code causes the means for processing to load instructions from an external memory to the volatile memory means, and to execute the instructions, when the OTP memory means has not been programmed. The boot code causes the means for processing to verify a digital signature of the instructions in the external memory before loading the instructions to the volatile memory means when the OTP memory means has been programmed.

Implementations of the apparatus can include one or more of the following features. Some implementations include means for descrambling data, where the instructions in the external memory are scrambled. When the OTP memory means has been programmed, the means for descrambling descrambles the scrambled instructions after loading the scrambled instructions to the volatile memory means. Some implementations include means for descrambling data. The instructions in the external memory are scrambled. When the OTP memory means has been programmed, the means for descrambling descrambles the instructions according to a key programmed in the OTP memory means. Some implementations include an integrated circuit that includes the apparatus. Some implementations include a hard disk drive that includes the integrated circuit. Some implementations include a disk player that includes the integrated circuit.

In other features, a computer program executable on a processor is provided and includes: instructions for testing a one-time-programmable (OTP) memory; instructions for loading instructions from an external memory, and executing the instructions, when the OTP memory has not been programmed; and instructions for verifying a digital signature of the instructions in the external memory before loading the instructions when the OTP memory has been programmed.

Implementations of the computer program can include one or more of the following features. In some implementations, the instructions in the external memory are scrambled. The computer program further includes instructions for descrambling the scrambled instructions after loading the scrambled instructions when the OTP memory has been programmed. In some implementations, the instructions in the external memory are scrambled. The computer program includes instructions for descrambling the scrambled instructions according to a key programmed in the OTP memory when the OTP memory has been programmed.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Implementations of the present disclosure provide security for system-on-a-chip (SoC) integrated circuits using one-time-programmable (OTP) memories. In one aspect, security is provided for test interfaces used to debug the SoC. The SoC includes the test interface, a processor, a read-only memory to store boot code for the processor, and a plurality of OTP memories. The test interface is in communication with the processor only when the test interface is enabled, and can be implemented as a Joint Test Action Group (JTAG) interface. The SoC can also include an application-specific circuit, which can include a device controller or the like, for example to control a hard disk drive, a Digital Video Disc (DVD) player/burner, or the like.

When the processor is booted, the boot code causes the processor to test or read one or more of the OTP memories, and to enable or disable the test interface based on the results. For example, the test interface can be enabled when the SoC is shipped to a customer such as a manufacturer of an electronic device that includes the SoC. The manufacturer can disable the test ports by programming one or more of the OTP memories before shipping the device for sale. If the device is returned for repair, the manufacturer can enable the test interface again. After repair, the manufacturer can disable the test interface again. The test interface can be enabled and disabled by programming the OTP memories in a prescribed manner, as described in detail below.

In another aspect, security is provided for data such as firmware, keys, and the like stored in a memory external to the SoC. The SoC includes a processor to execute the firmware, a volatile memory, a one-time-programmable (OTP) memory, and a non-volatile memory to store boot code for the processor. When the processor is booted, the boot code causes the processor to test the OTP memory. If the OTP memory has not been programmed, the boot code causes the processor to load the firmware from an external memory to the volatile memory, and to execute the firmware.

But if the OTP memory has been programmed, the boot code causes the processor to verify a digital signature of the firmware in the external memory before loading the firmware to the volatile memory. In addition, the firmware can be scrambled, and the SoC can include a descrambler to descramble the scrambled firmware, after loading the scrambled firmware to the volatile memory, for example using a key programmed in the OTP memory.

Figure 1:
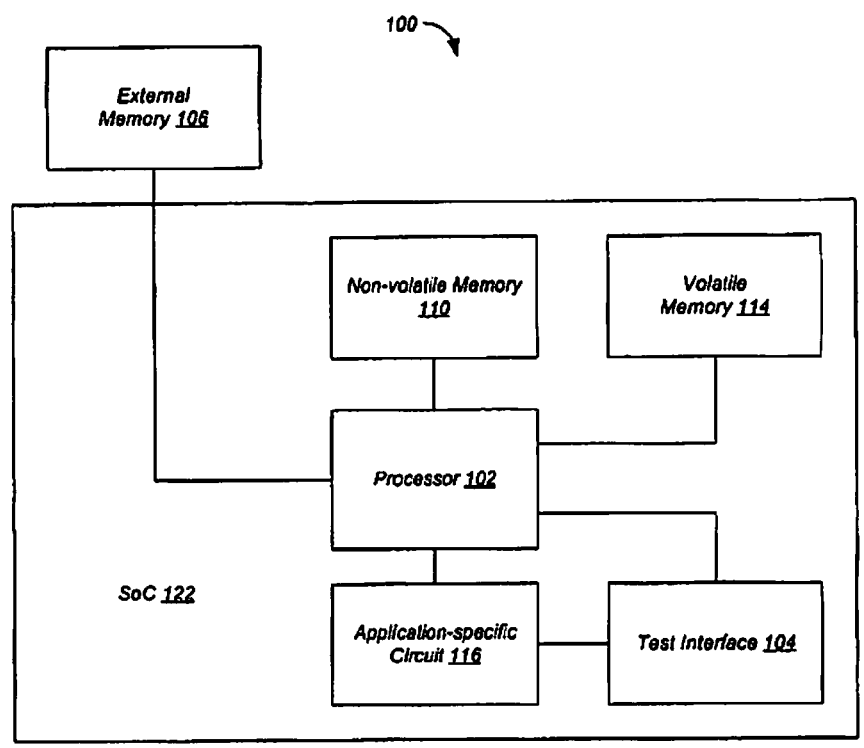
FIG. 1 shows a prior art SoC system including a SoC.
Figure 2:
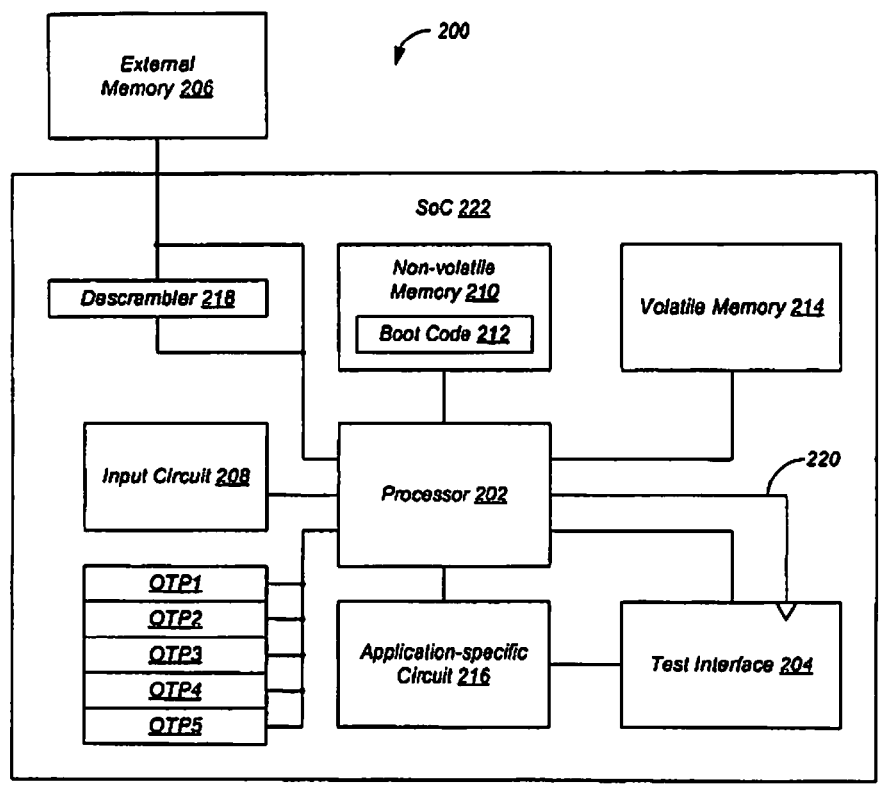
FIG. 2 shows a SoC system according to the present disclosure.

FIG. 2 shows a SoC system 200 according to the present disclosure. Although in the described implementation, the elements of SoC system 200 are presented in one arrangement, other implementations may feature other arrangements, as will be apparent to one skilled in the relevant arts based on the disclosure and teachings provided herein. For example, the elements of SoC system 200 can be implemented in hardware, software, or combinations thereof.

SoC system 200 includes a SoC 222 and an external memory 206. External memory 206 can store firmware and confidential data for SoC 222, and can be implemented as a flash memory and the like. When SoC system 200 is implemented in a disk drive, disk player, and the like, the confidential data can include keys for content distribution and digital rights management. The keys can include keys such as Advanced Access Content System (AACS) keys and the like.

In some implementations, some or all of the data stored in external memory 206 is scrambled according to a scrambling process. These implementations include a descrambler 218 to descramble the data according to a descrambling process when the processor loads the data from external memory 206. The scrambling and descrambling processes can include an Advanced Encryption Standard (AES) process, a Data Encryption Standard (DES) process, a shared-key process, and the like. In these implementations, even if an attacker is somehow able to access SoC 222 through test interface 204, the attacker will still be faced with the problem of descrambling the data.

SoC 222 includes a processor 202, a volatile memory 214, a non-volatile memory 210 to store boot code 212, a test interface 204, and an application-specific circuit 216. For example, when SoC 222 is intended to control a disc player such as a DVD player, application-specific circuit 216 can include a disc controller and a read channel. Of course, other implementations can include other sorts of application-specific circuits.

Test interface 204 can be implemented as Joint Test Action Group (JTAG) interface and the like for use in debugging and testing SoC 222. Test interface 204 is generally connected to processor 202 and application-specific circuit 216, and can be connected to other circuits in SoC 222 as well. For example, test interface 204 can be used to trace the execution by processor 202 of firmware stored in volatile memory 214.

SoC 222 also includes one or more one-time-programmable (OTP) memories. In the implementation of FIG. 2, SoC 222 includes five OTP memories OTP1, OTP2, OTP3, OTP4, and OTP5. SoC 222 also includes an input circuit 208 to receive inputs such as manufacturer passwords and the like. The OTP memories can be programmed by processor 202 in response to programming signals received on input circuit 208.

Figure 3:
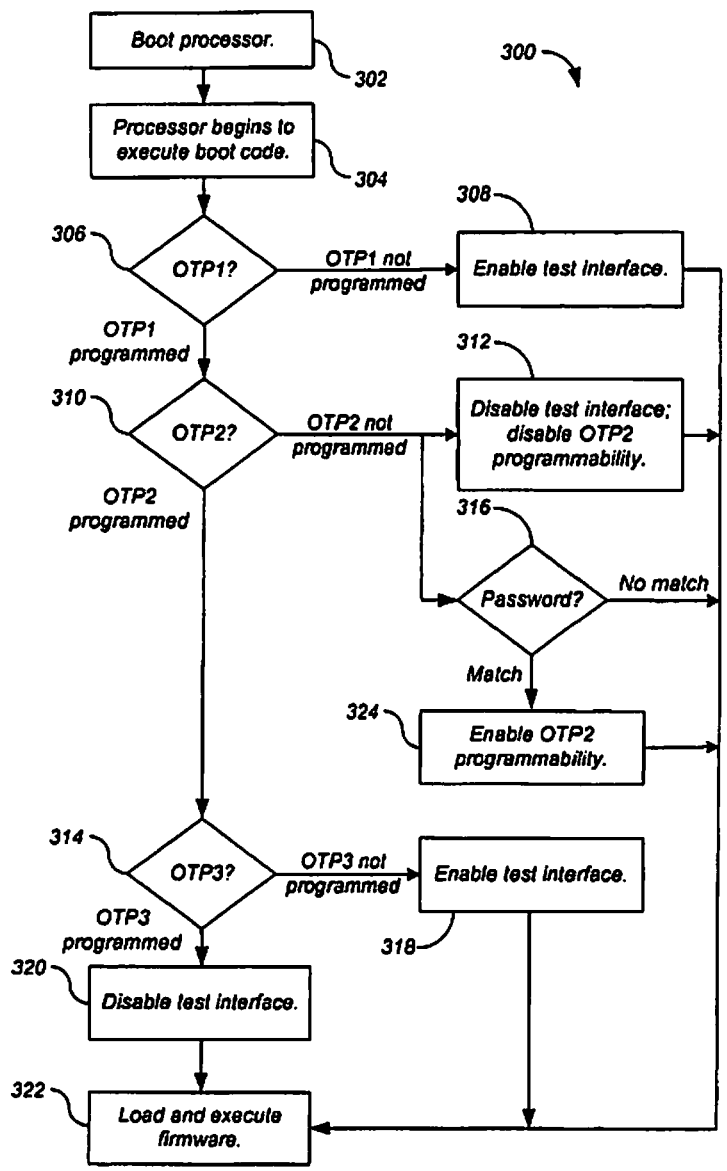
FIG. 3 shows a process for securing test interface of the SoC of FIG. 2 according to the present disclosure.

FIG. 3 shows a process for securing test interface 204 of SoC 222 of FIG. 2 according to the present disclosure. Although in the described implementation, the elements of process 300 are presented in one arrangement, other implementations may feature other arrangements, as will be apparent to one skilled in the relevant arts based on the disclosure and teachings provided herein. For example, in various implementations, some or all of the steps of process 300 can be executed in a different order, concurrently, and the like.

Processor 202 is booted (step 302), for example by cycling power to SoC 222, applying a reset signal to processor 202, or the like, as is well-known in the relevant arts. When booted, processor 202 begins to execute boot code 212 stored in non-volatile memory 210 (step 304). Boot code 212 causes processor 202 to test or read memory OTP1 to determine whether memory OTP1 has been programmed (step 306).

If memory OTP1 has not been programmed, boot code 212 causes processor 202 to enable test interface 204 (step 308). For example, when SoC 222 is shipped from a manufacturer to a customer, memory OTP1 is not programmed, thereby enabling the customer to use test interface 204 for debugging and the like. Boot code 212 then causes processor 202 to load and execute firmware stored in external memory 206 (step 322). External memory 206 can be secured as described below with reference to FIG. 4.

However, if memory OTP1 has been programmed, boot code 212 causes processor 202 to test or read memory OTP2 to determine whether memory OTP2 has been programmed (step 310). If memory OTP2 has not been programmed, boot code 212 causes processor 202 to disable test interface 204, and to disable programmability of memory OTP2 (step 312). For example, before a customer ships a disk drive including SoC 222, the customer programs memory OTP2, thereby disabling test interface 204 to prevent end users from tampering with SoC 222. In the mean time, the programmability of memory OTP2 is disabled and memory OTP4 is programmed with a password or the hash value of a password. A password is required to re-enable programmability of memory OTP2, which must be programmed to re-enable test interface 204. Boot code 212 then causes processor 202 to load and execute firmware stored in external memory 206 (step 322).

If a password received on input circuit 208 matches the value stored in memory OTP4 (step 316), the programmability of memory OTP2 is enabled (step 324). Then memory OTP2 can be programmed. If boot code 212 finds that memory OTP2 has been programmed, boot code 212 causes processor 202 to test or read memory OTP3 to determine whether memory OTP3 has been programmed (step 314). If memory OTP3 has not been programmed, boot code 212 causes processor 202 to re-enable test interface 204 (step 318). For example, the password can be programmed in memory OTP4 by a manufacturer of a disk drive including SoC 222, while also programming memory OTP1, and if the disk drive is returned for service, the manufacturer can enter the password, and program memory OTP2, to re-enable test interface 204 in order to perform the service. In some implementations, the password is hashed before storage in OTP4, and the entered password is hashed before comparison with the stored password.

If the password entered does not match the stored password, boot code 212 causes processor 202 to load and execute the firmware stored in external memory 206 without re-enabling the programmability of memory OTP2 (step 322). Otherwise, boot code 212 causes processor 202 to re-enable the programmability of memory OTP2 (step 324) before loading and executing the firmware stored in external memory 206 (step 322).

However, if memory OTP3 has been programmed, boot code 212 causes processor 202 to disable test interface 204 (step 320). Boot code 212 then causes processor 202 to load and execute the firmware stored in external memory 206 (step 322). For example, after servicing a disk drive including SoC 222, the manufacturer can program OTP3 to disable test interface 204. Of course, while process 300 employs only four OTP memories, additional OTP memories can be included in SoC 222 to allow further enabling and disabling of test interface 204, as will be apparent to one skilled in the relevant arts based on the disclosure and teachings provided herein.

Figure 4:
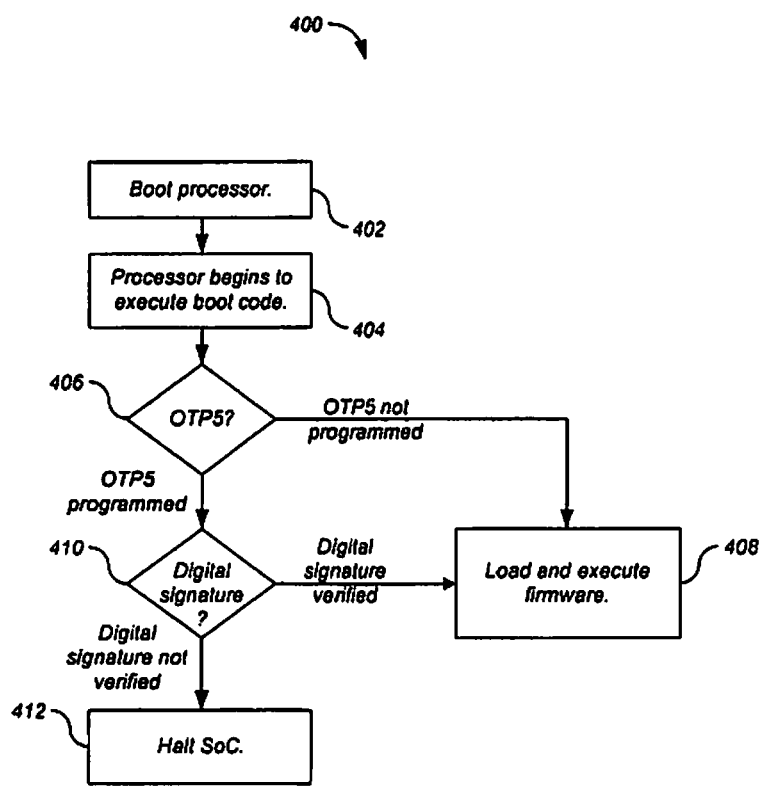
FIG. 4 shows a process for securing the external memory of the SoC system of FIG. 2 according to the present disclosure.

FIG. 4 shows a process for securing external memory 206 of SoC system 200 of FIG. 2 according to the present disclosure. Although in the described implementation, the elements of process 400 are presented in one arrangement, other implementations may feature other arrangements, as will be apparent to one skilled in the relevant arts based on the disclosure and teachings provided herein. For example, in various implementations, some or all of the steps of process 400 can be executed in a different order, concurrently, and the like.

Processor 202 is booted (step 402), for example by cycling power to SoC 222, applying a reset signal to processor 202, or the like, as is well-known in the relevant arts. When booted, processor 202 begins to execute boot code 212 stored in non-volatile memory 210 (step 404). Boot code 212 causes processor 202 to test or read memory OTP5 to determine whether memory OTP5 has been programmed (step 406).

If memory OTP5 has not been programmed, boot code 212 causes processor 202 to load and execute the firmware from external memory 206 (step 408). That is, processor 202 loads the instructions from external memory 206 to volatile memory 214 of SoC 222, and executes the instructions from volatile memory 214.

However, if memory OTP5 has been programmed, boot code 212 causes processor 202 to verify a digital signature of the instructions in external memory 206 (step 410) before loading the instructions to volatile memory 214 (step 408). If the digital signature cannot be verified, boot code 212 causes processor 202 to halt SoC 222 (step 412). The digital signature can be programmed into memory OTP5, for example by a manufacturer of a disk drive including SoC 222. Other forms of verification can be used instead of a digital signature, such as message authentication codes and the like.

Figure 5B:
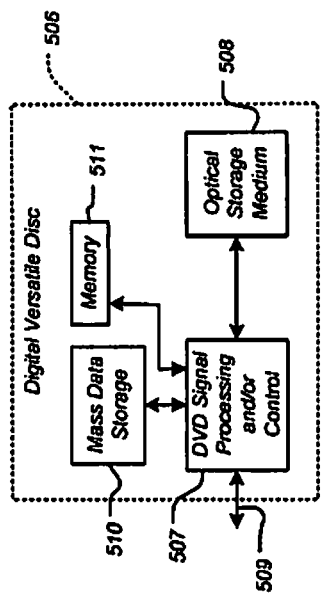
FIGS. 5A-5G show various exemplary implementations of the present disclosure.
Figure 5A:
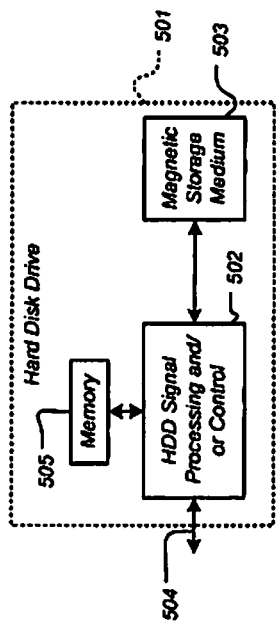

Referring now to FIG. 5A, the implementations disclosed herein may be incorporated in a hard disk drive (HDD) 501, and/or in either or both signal processing and/or control circuits, which are generally identified in FIG. 5A at 502. In some implementations, the signal processing and/or control circuit 502 and/or other circuits (not shown) in the HDD 501 may process data, perform coding and/or encryption, perform calculations, and/or format data that is output to and/or received from a magnetic storage medium 503.

The HDD 501 may communicate with a host device (not shown) such as a computer, mobile computing devices such as personal digital assistants, cellular phones, media or MP3 players and the like, and/or other devices via one or more wired or wireless communication links 504. The HDD 501 may be connected to memory 505 such as random access memory (RAM), nonvolatile memory such as flash memory, read only memory (ROM) and/or other suitable electronic data storage.

Referring now to FIG. 5B, the implementations disclosed herein may be incorporated in a digital versatile disc (DVD) drive 506, and/or in either or both signal processing and/or control circuits, which are generally identified in FIG. 5B at 507, and/or mass data storage of the DVD drive 506. The signal processing and/or control circuit 507 and/or other circuits (not shown) in the DVD drive 506 may process data, perform coding and/or encryption, perform calculations, and/or format data that is read from and/or data written to an optical storage medium 508. In some implementations, the signal processing and/or control circuit 507 and/or other circuits (not shown) in the DVD drive 506 can also perform other functions such as encoding and/or decoding and/or any other signal processing functions associated with a DVD drive.

The DVD drive 506 may communicate with an output device (not shown) such as a computer, television or other device via one or more wired or wireless communication links 509. The DVD drive 506 may communicate with mass data storage 510 that stores data in a nonvolatile manner. The mass data storage 510 may include a hard disk drive (HDD). The HDD may have the configuration shown in FIG. 5A. The HDD may be a mini HDD that includes one or more platters having a diameter that is smaller than approximately 1.8". The DVD drive 506 may be connected to memory 511 such as RAM, ROM, low latency nonvolatile memory such as flash memory and/or other suitable electronic data storage.

Figures 5C, 5D:
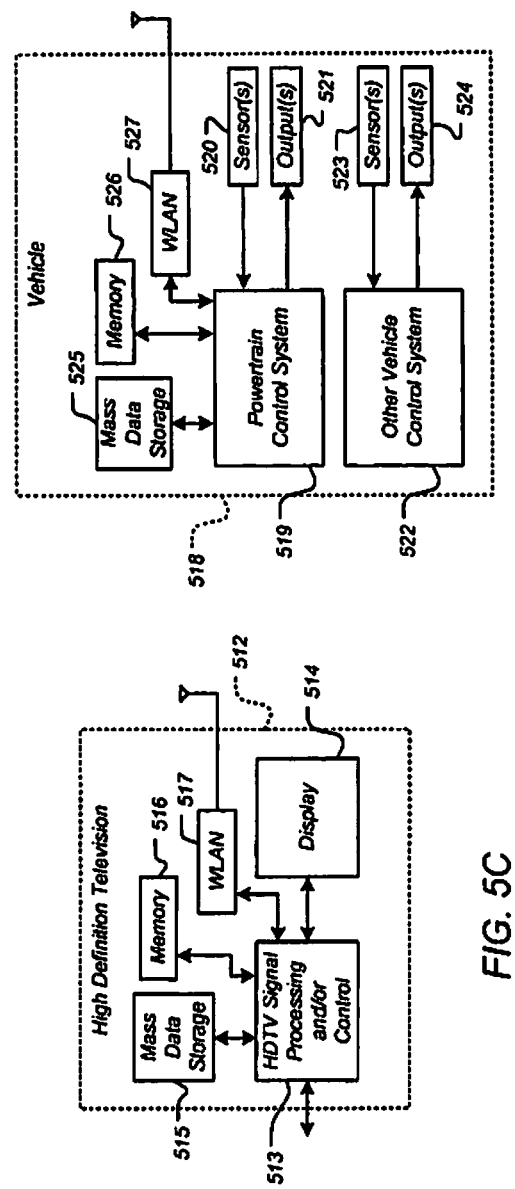

Referring now to FIG. 5C, the implementations disclosed herein may be incorporated in: a high definition television (HDTV) 512; either or both signal processing and/or control circuits, which are generally identified in FIG. 5C at 513; a WLAN interface; and/or mass data storage of the HDTV 512. The HDTV 512 receives HDTV input signals in either a wired or wireless format and generates HDTV output signals for a display 514. In some implementations, signal processing circuit and/or control circuit 513 and/or other circuits (not shown) of the HDTV 512 may process data, perform coding and/or encryption, perform calculations, format data and/or perform any other type of HDTV processing that may be required.

The HDTV 512 may communicate with mass data storage 515 that stores data in a nonvolatile manner such as optical and/or magnetic storage devices. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". The HDTV 512 may be connected to memory 516 such as RAM, ROM, low latency nonvolatile memory such as flash memory and/or other suitable electronic data storage. The HDTV 512 also may support connections with a WLAN via a WLAN network interface 517.

Referring now to FIG. 5D, the implementations disclosed herein may be incorporated in a control system of a vehicle 518 is shown. The control system 518 includes a WLAN interface and/or mass data storage. The implementations disclosed herein may be incorporated in a powertrain control system 519 of the vehicle 518. The powertrain control system 519 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The implementations disclosed herein may be incorporated in other control systems 522 of the vehicle 518. The control system 522 may likewise receive signals from input sensors 523 and/or output control signals to one or more output devices 524. In some implementations, the control system 522 may be part of an anti-lock braking system (ABS), a navigation system, a telematics system, a vehicle telematics system, a lane departure system, an adaptive cruise control system, a vehicle entertainment system such as a stereo, DVD drive, compact disc drive and the like. Still other implementations are contemplated.

The powertrain control system 519 may communicate with mass data storage 525 that stores data in a nonvolatile manner. The mass data storage 525 may include optical and/or magnetic storage devices including HDDs and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". The powertrain control system 519 may be connected to memory 526 such as RAM, ROM, low latency nonvolatile memory such as flash memory and/or other suitable electronic data storage. The powertrain control system 519 also may support connections with a WLAN via a WLAN network interface 527. The control system 522 may also include mass data storage, memory and/or a WLAN interface (all not shown).

Figure 5E:
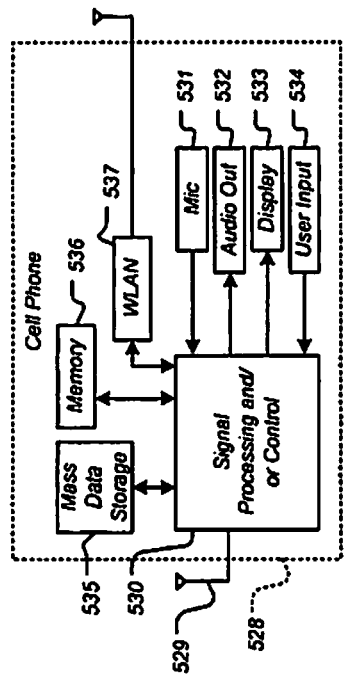

Referring now to FIG. 5E, the implementations disclosed herein may be incorporated in: a cellular phone 528 that may include a cellular antenna 529; either or both signal processing and/or control circuits, which are generally identified in FIG. 5E at 530; a WLAN interface; and/or mass data storage of the cellular phone 528. In some implementations, the cellular phone 528 includes a microphone 531, an audio output 532 such as a speaker and/or audio output jack, a display 533 and/or an input device 534 such as a keypad, pointing device, voice actuation and/or other input device. The signal processing and/or control circuits 530 and/or other circuits (not shown) in the cellular phone 528 may process data, perform coding and/or encryption, perform calculations, format data and/or perform other cellular phone functions.

The cellular phone 528 may communicate with mass data storage 535 that stores data in a nonvolatile manner such as optical and/or magnetic storage devices including HDDs and/or DVD drives. At least one HDD may have the configuration shown in FIG. 5A and/or at least one DVD drive may have the configuration shown in FIG. 56. The HDD may be a mini HDD that includes one or more platters having a diameter that is smaller than approximately 1.8". The cellular phone 528 may be connected to memory 536 such as RAM, ROM, low latency nonvolatile memory such as flash memory and/or other suitable electronic data storage. The cellular phone 528 also may support connections with a WLAN via a WLAN network interface 537.

Figure 5F:
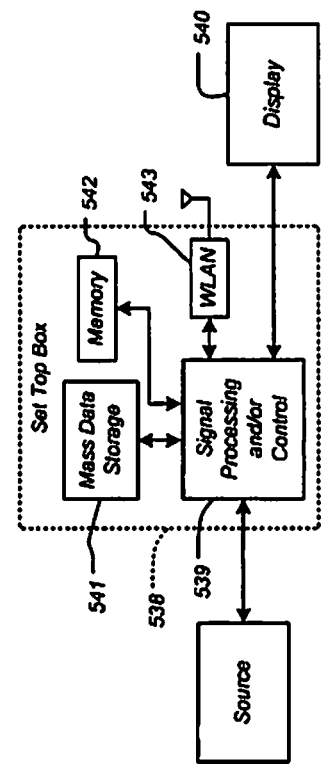

Referring now to FIG. 5F, the implementations disclosed herein may be incorporated in: a set top box 538; either or both signal processing and/or control circuits, which are generally identified in FIG. 5F at 539; a WLAN interface; and/or mass data storage of the set top box 538. The set top box 538 receives signals from a source such as a broadband source and outputs standard and/or high definition audio/video signals suitable for a display 540 such as a television and/or monitor and/or other video and/or audio output devices. The signal processing and/or control circuits 539 and/or other circuits (not shown) of the set top box 538 may process data, perform coding and/or encryption, perform calculations, format data and/or perform any other set top box functions.

The set top box 538 may communicate with mass data storage 543 that stores data in a nonvolatile manner. The mass data storage 543 may include optical and/or magnetic storage devices including HDDs and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". The set top box 538 may be connected to memory 542 such as RAM, ROM, low latency nonvolatile memory such as flash memory and/or other suitable electronic data storage. The set top box 538 also may support connections with a WLAN via a WLAN network interface 543.

Figure 5G:
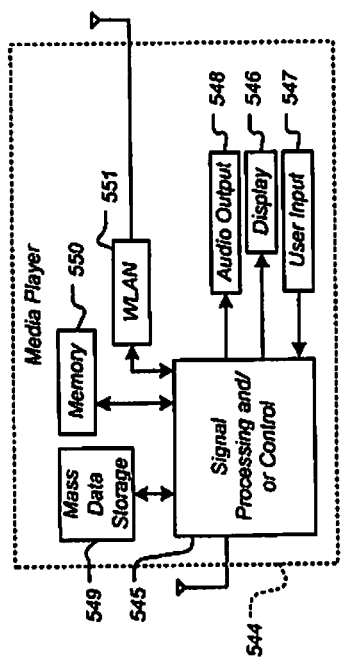

Referring now to FIG. 5G, the implementations disclosed herein may be incorporated in: a media player 544; either or both signal processing and/or control circuits, which are generally identified in FIG. 5G at 545; a WLAN interface; and/or mass data storage of the media player 544. In some implementations, the media player 544 includes a display 546 and/or a user input 547 such as a keypad, touchpad and the like. In some implementations, the media player 544 may employ a graphical user interface (GUI) that typically employs menus, drop down menus, icons and/or a point-and-click interface via the display 546 and/or user input 547. The media player 544 further includes an audio output 548 such as a speaker and/or audio output jack. The signal processing and/or control circuits 545 and/or other circuits (not shown) of the media player 544 may process data, perform coding and/or encryption, perform calculations, format data and/or perform any other media player functions.

The media player 544 may communicate with mass data storage 549 that stores data such as compressed audio and/or video content in a nonvolatile manner. In some implementations, the compressed audio files include files that are compliant with MP3 format or other suitable compressed audio and/or video formats. The mass data storage 549 may include optical and/or magnetic storage devices including HDDs and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". The media player 544 may be connected to memory 550 such as RAM, ROM, low latency nonvolatile memory such as flash memory and/or other suitable electronic data storage. The media player 544 also may support connections with a WLAN via a WLAN network interface 551. Still other implementations in addition to those described above are contemplated.

The implementations disclosed herein may be incorporated in digital electronic circuitry, or in computer hardware, firmware, software, or in combinations of them. Apparatuses disclosed herein can be implemented in a computer program product tangibly embodied in a machine-readable storage device for execution by a programmable processor; and corresponding method tasks can be performed by a programmable processor executing a program of instructions to perform functions by operating on input data and generating output.

The implementations disclosed herein may be incorporated in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, application-specific integrated circuits (ASICs).

A number of implementations have been described. Nevertheless, it will be understood that various modifications may be made without departing from the spirit and scope of the implementations. Accordingly, other implementations are within the scope of the following claims.

What is claimed is:

1. An integrated circuit comprising:
a first memory configured to store a key, wherein the first memory is a one-time-programmable memory;
a second memory;
a processor configured to
determine whether the first memory has been programmed,
in response to the first memory not having been programmed, (i) load firmware from a third memory into the second memory, and (ii) execute the firmware, wherein the third memory is separate from the integrated circuit, and
in response to the first memory having been programmed, load the firmware from the third memory into the second memory; and
a descrambler configured to, in response to the first memory having been programmed, descramble the firmware based on the key.

2. The integrated circuit of claim 1, wherein the processor is configured to, in response to the first memory having been programmed and prior to the loading of the firmware from the third memory into the second memory:
determine whether a digital signature of the firmware is verified;
if the signature of the firmware is verified, (i) load the firmware from the third memory into the second memory, and (ii) execute the firmware; and
if the signature of the firmware is not verified, cease operation of the integrated circuit.

3. The integrated circuit of claim 1, wherein the second memory includes volatile memory.

4. The integrated circuit of claim 1, wherein:
the second memory is configured to store a boot code; and
the processor is configured to, while booting up, (i) execute the boot code, and (ii) based on the boot code, determine whether the first memory has been programmed.

5. The integrated circuit of claim 4, wherein the processor is configured to:
in response to the first memory not having been programmed based on the boot code, (i) load the firmware from the third memory into the second memory, and (ii) execute the firmware; and
in response to the first memory having been programmed based on the boot code, load the firmware from the third memory into the second memory for the descrambling of the firmware.

6. The integrated circuit of claim 1, further comprising:
a fourth memory, wherein the fourth memory is one-time-programmable;
a fifth memory, wherein the fifth memory is one-time-programmable; and
a test interface (i) configured for testing the integrated circuit, and (ii) configured to permit signals to be transferred between the test interface and the processor when the test interface is enabled,
wherein the processor is configured to
prior to the loading of the firmware from the third memory into the second memory, determine whether the fourth memory has been programmed,
in response to the fourth memory not having been programmed, (i) enable the test interface, (ii) load the firmware from the third memory into the second memory, and (iii) execute the firmware, and
in response to the fourth memory having been programmed, (i) disable programmability of the fifth memory, (ii) load the firmware from the third memory into the second memory, and (iii) execute the firmware.

7. The integrated circuit of claim 6, wherein the processor is configured to:
prior to the loading of the firmware from the third memory into the second memory, determine whether the fifth memory has been programmed; and
in response to the fifth memory not having been programmed, (i) disable programmability of the fifth memory, (ii) load the firmware from the third memory into the second memory, and (iii) execute the firmware.

8. The integrated circuit of claim 6, further comprising an input circuit configured to receive a first password, wherein:
the fifth memory is configured to store a second password; and
in response to (i) each of the fourth memory and the fifth memory having been previously programmed and (ii) the first password matching the second password, the processor is configured to (i) enable the test interface, (ii) load the firmware from the third memory into the second memory, and (iii) execute the firmware.

9. The integrated circuit of claim 8, wherein in response to (i) each of the fourth memory and the fifth memory having been programmed and (ii) the second password not matching the first password, the processor is configured to (i) refrain from enabling the test interface, (ii) load the firmware from the third memory into the second memory, and (iii) execute the firmware.

10. The integrated circuit of claim 8, wherein the processor is configured to, in response to the second password matching the first password, enable programmability of the fifth memory.

11. The integrated circuit of claim 6, further comprising an input circuit configured to receive a first password, wherein:
the fifth memory is configured to store a second password; and
wherein in response to (i) each of the fourth memory and the fifth memory having been programmed and (ii) the second password matching the first password, the processor is configured to (i) enable programmability of the fifth memory, (ii) load the firmware from the third memory into the second memory, and (iii) execute the firmware.

12. The integrated circuit of claim 6, further comprising:
a sixth memory, wherein the sixth memory is a one-time-programmable memory; and
an input circuit configured to receive a first password, wherein
    the fifth memory is configured to store a second password, and
    in response to each of the fourth memory, the fifth memory, and the sixth memory having been previously programmed, the processor is configured to (i) disable the test interface, (ii) load the firmware from the third memory into the second memory, and (iii) execute the firmware.

13. A method comprising:
storing a key in a first memory, wherein the first memory is a one-time-programmable memory, wherein the first memory is implemented in an integrated circuit;
determining whether the first memory has been programmed;
in response to the first memory not having been programmed, (i) loading firmware from a third memory into a second memory, and (ii) executing the firmware, wherein the second memory is implemented in the integrated circuit, and wherein the third memory is separate from the integrated circuit; and
in response to the first memory having been programmed, (i) loading the firmware from the third memory into the second memory, and (ii) descrambling the firmware based on the key.

14. The method of claim 13, further comprising, in response to the first memory having been programmed and prior to the loading of the firmware from the third memory into the second memory:
    determining whether a digital signature of the firmware is verified;
    if the signature of the firmware is verified, (i) loading the firmware from the third memory into the second memory, and (ii) executing the firmware; and
    if the signature of the firmware is not verified, ceasing operation of the integrated circuit.

15. The method of claim 13, wherein the second memory includes volatile memory.

16. The method of claim 13, further comprising, while booting up:
    executing a boot code stored in the second memory; and
    based on the boot code, determining whether the first memory has been programmed.

17. The method of claim 16, further comprising:
in response to the first memory not having been programmed based on the boot code, (i) loading the firmware from the third memory into the second memory, and (ii) executing the firmware; and
in response to the first memory having been programmed based on the boot code, loading the firmware from the third memory into the second memory for the descrambling of the firmware.

18. The method of claim 13, further comprising:
when a test interface of the integrated circuit is enabled, permitting signals to be transferred between the test interface and a processor, wherein the processor is implemented in the integrated circuit;
prior to the loading of the firmware from the third memory into the second memory, determine whether a fourth memory has been programmed, wherein the fourth memory is one-time-programmable;
in response to the fourth memory not having been programmed, (i) enabling the test interface, (ii) loading the firmware from the third memory into the second memory, and (iii) execute the firmware; and
in response to the fourth memory having been programmed, (i) disabling programmability of a fifth memory, (ii) loading the firmware from the third memory into the second memory, and (iii) executing the firmware, wherein the fifth memory is one-time-programmable.

19. The method of claim 18, further comprising:
prior to the loading of the firmware from the third memory into the second memory, determining whether the fifth memory has been programmed; and
in response to the fifth memory not having been programmed, (i) disabling programmability of the fifth memory, (ii) loading the firmware from the third memory into the second memory, and (iii) executing the firmware.

20. The method of claim 18, further comprising:
receiving a first password; and
in response to (i) each of the fourth memory and the fifth memory having been previously programmed and (ii) the first password matching a second password, (i) enabling the test interface, (ii) loading the firmware from the third memory into the second memory, and (iii) executing the firmware, wherein the second password is stored in the fifth memory.

* * * * *